(12) United States Patent
Kobylecky et al.

(10) Patent No.: US 9,476,340 B2
(45) Date of Patent: Oct. 25, 2016

(54) VEHICLE WITH STIRLING ENGINE INTEGRATED INTO ENGINE EXHAUST SYSTEM

(75) Inventors: Mychajlo S. Kobylecky, Mississauga (CA); Harry E. Eustice, Troy, MI (US); Raymond C. Majcher, Howell, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 823 days.

(21) Appl. No.: 13/448,128

(22) Filed: Apr. 16, 2012

(65) Prior Publication Data

US 2013/0269343 A1 Oct. 17, 2013

(51) Int. Cl.
| | |
|---|---|
| *F01K 23/10* | (2006.01) |
| *F01N 5/02* | (2006.01) |
| *F02G 1/043* | (2006.01) |
| *F02G 1/06* | (2006.01) |
| *F02G 5/04* | (2006.01) |

(52) U.S. Cl.
CPC .............. *F01N 5/02* (2013.01); *F02G 1/043* (2013.01); *F02G 1/06* (2013.01); *F02G 5/04* (2013.01); *F02G 2260/00* (2013.01); *F02G 2280/20* (2013.01); *Y02T 10/16* (2013.01); *Y02T 10/166* (2013.01)

(58) Field of Classification Search
CPC ...... F02G 1/043; F02G 5/02; F02G 2260/00; Y02T 10/166; Y02T 10/16; Y02T 10/26; F01N 5/02; F02B 3/06
USPC .................. 60/320, 517, 597, 615, 616, 618
See application file for complete search history.

(56) References Cited

U.S. PATENT DOCUMENTS

| | | | |
|---|---|---|---|
| 3,902,546 A | 9/1975 | Linhardt et al. | |
| 4,362,014 A | 12/1982 | Driver et al. | |
| 4,759,324 A | 7/1988 | Kita et al. | |
| 4,831,927 A | 5/1989 | Lin et al. | |
| 5,228,309 A | 7/1993 | McCullough | |
| 5,323,603 A | 6/1994 | Malohn | |
| 5,833,446 A | 11/1998 | Smith et al. | |
| 6,606,864 B2 | 8/2003 | MacKay | |
| 7,181,912 B2 * | 2/2007 | Mori ............................... | 60/616 |
| 7,231,894 B2 | 6/2007 | Driver | |

(Continued)

FOREIGN PATENT DOCUMENTS

| | | |
|---|---|---|
| CN | 102102569 A | 6/2011 |
| JP | 2009156162 A | 7/2009 |
| WO | 2004059139 A1 | 7/2004 |

OTHER PUBLICATIONS

State Intellectual Property Office of the People'S Republic of China, Office Action in Chinese Patent Application No. 201310131081.4, mailed Dec. 26, 2014.

*Primary Examiner* — Thomas Denion
*Assistant Examiner* — Thomas Olszewski
(74) *Attorney, Agent, or Firm* — Lorenz & Kopf, LLP

(57) ABSTRACT

In accordance with exemplary embodiments, a Stirling engine is integrated into an exhaust system of a vehicle. The system comprises an engine coupled to a cooling system and an exhaust system. An emission control system is coupled to the exhaust system. A Stirling engine has one end coupled to the cooling system and another end selectively coupled to the exhaust system between the engine and the emission control system, and configured be driven from heat extracted from exhaust gas flow. The Stirling engine drives an electrical energy generator that provides electrical energy for storage in an energy storage system.

16 Claims, 4 Drawing Sheets

(56) References Cited

U.S. PATENT DOCUMENTS

| | | |
|---|---|---|
| 7,311,077 B2 | 12/2007 | Driver |
| 7,726,129 B2 | 6/2010 | Driver |
| 2002/0017098 A1* | 2/2002 | Johansson ............... 60/517 |
| 2003/0226360 A1 | 12/2003 | Black |
| 2004/0134853 A1 | 7/2004 | Miller, III |
| 2011/0232301 A1 | 9/2011 | He et al. |

* cited by examiner

VEHICLE WITH STIRLING ENGINE INTEGRATED INTO ENGINE EXHAUST SYSTEM

TECHNICAL FIELD

The technical field generally relates to electrical power generation for vehicles, and more particularly to a Stirling engine that may provide electrical energy by extracting heat from an exhaust system of a vehicle.

BACKGROUND

Vehicle designers are continually seeking techniques for increasing the efficiency of vehicle operation. Some improvements have been made to use less energy during vehicle operation, while other improvements seek to recover energy expended or lost during vehicle operation. For example, approximately sixty-eight percent of the energy provided from vehicle fuel is lost through inefficiencies of an internal combustion engine, some of which are in the exhaust system, with that loss being in the form of heat. Since energy loss is undesirable, it would be advantageous to recover some of the heat energy that conventionally is wasted during vehicle operation.

A Stirling engine operates via a temperature difference between a hot side and cool side of the engine. FIGS. 1-4 are partial cut-away views that illustrate the basic operation of a conventional Stirling engine. Referring to FIG. 1, the Stirling engine 10 is shown in the contraction phase. A cylinder 12 is positioned having a heat source 14 on one end of the cylinder 12 and a cooling source 16 on an opposite end. A piston 18 is made to move within the cylinder 12 due to the heating and cooling of gases 24 within the cylinder 12. A displacer 22 assists in moving the gases 24 between the heat source 14 (the hot side of the Stirling engine 10) and the cooling source 16 (the cool side of the Stirling engine 10). The piston 18 is coupled to a flywheel (not shown) via a shaft 20 allowing the Stirling engine 10 to produce work via the oscillation of the piston 18 within the cylinder as is commonly known. One form of work for a Stirling engine is to convert the mechanical movement of the piston 18 into electrical energy by driving a generator from the Stirling engine 10.

In the contraction phase, the gases 24 have collected near the cooling source 16 and are contracting due to the extraction of heat from the gases. The cooling source 16 may be a heat sink (e.g., cooling fins) or an active cooling source such as a cooling fluid pumped around the cool end of the Stirling engine 10. The contracting gases 24 draw the piston 18 into the cylinder 12 as indicted by the arrow 26.

Referring now to FIG. 2, the transfer stage of the Stirling engine 10 is illustrated. In the transfer stage, the displacer 22 moves toward the cool side of the Stirling engine 10 (as indicated by the arrow 28), which drives the gases 24 toward the hot side of the Stirling engine. This positions the gases 24 over the heat source 14 so that they can be heated in the expansion phase, which is illustrated in FIG. 3.

As illustrated in FIG. 3, the gases 24 expand upon being heated by the heat source 14. The heat source 14 can be any heat source, including but not limited to, a fuel burner or the exhaust gases of a fuel burning engine such as an internal combustion engine. The expanding gases 24 drive the piston 18 outward as indicated by the arrow 30.

Referring now to FIG. 4, the final stage of operation for a Stirling engine is to again transfer the gases 24. In this transfer stage, the displacer 22 is moved (as indicated by the arrow 32) into the cylinder 12 via the flywheel (not shown), which forces the gases 24 toward the cool side of the Stirling engine 10 so that the cycle may repeat beginning again as described in connection with FIG. 1.

Thus, a Stirling engine could be utilized to recover some of the otherwise wasted heat energy in the exhaust system of contemporary motor vehicles. However, contemporary vehicles are subject to emission control standards that must be maintained during the operation of the vehicle. Some emission control systems must achieve a certain operational temperature to be fully effective, and this operational temperature is commonly achieved by being heated by the exhaust gases. Therefore, a Stirling engine could recover so much heat energy from the exhaust gases that the emission control system does not achieve the intended operational temperature to be effective at maintaining emission control standards during vehicle operation.

Accordingly, it would be desirable to provide a system and method for incorporating a Stirling engine into a vehicle for electrical power generation, while maintaining vehicle emissions requirements. Additionally, other desirable features and characteristics of the present disclosure will become apparent from the subsequent description taken in conjunction with the accompanying drawings and the foregoing technical field and background.

SUMMARY

In accordance with exemplary embodiments, a Stirling engine is integrated into an exhaust system of a vehicle. The system comprises an engine coupled to a cooling system and an exhaust system. An emission control system is coupled to the exhaust system. A Stirling engine has one end coupled to the cooling system and another end selectively coupled to the exhaust system between the engine and the emission control system, and configured be driven from heat extracted from exhaust gas flow. The Stirling engine drives an electrical energy generator that provides electrical energy for storage in an energy storage system.

In accordance with exemplary embodiments, a method is provided for operating a Stirling engine integrated into an exhaust system of a vehicle. The method comprises controlling a valve to direct exhaust gas flow to an emission control system of vehicle until a predetermined condition occurs. Also, the valve is controlled to direct exhaust gas flow to the Stirling engine after the predetermined condition occurs. In this way, the Stirling engine is operated via heat extracted from the exhaust gas flow so that the Stirling engine can drive a generator to generate electrical energy for storage in an energy storage system.

DESCRIPTION OF THE DRAWINGS

The subject matter will hereinafter be described in conjunction with the following drawing figures, wherein like numerals denote like elements, and.

DETAILED DESCRIPTION

The following detailed description is merely exemplary in nature and is not intended to limit the subject matter of the disclosure or its uses. Furthermore, there is no intention to be bound by any expressed or implied theory presented in the preceding technical field, background, brief summary or the following detailed description.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language.

Additionally, the following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that, although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

Finally, for the sake of brevity, conventional techniques and components related to vehicle mechanical and electrical parts and other functional aspects of the system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the disclosure.

Figure 1:
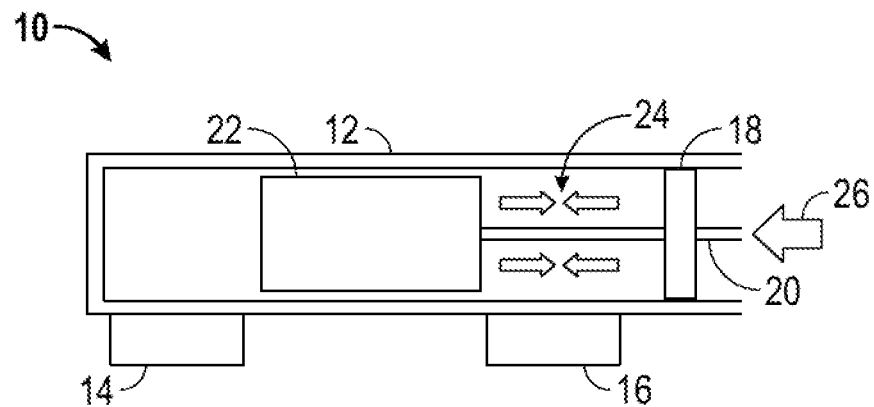
FIGS. 1-4 are illustrations useful for understanding the basic operation of a conventional Stirling engine.
Figure 2:
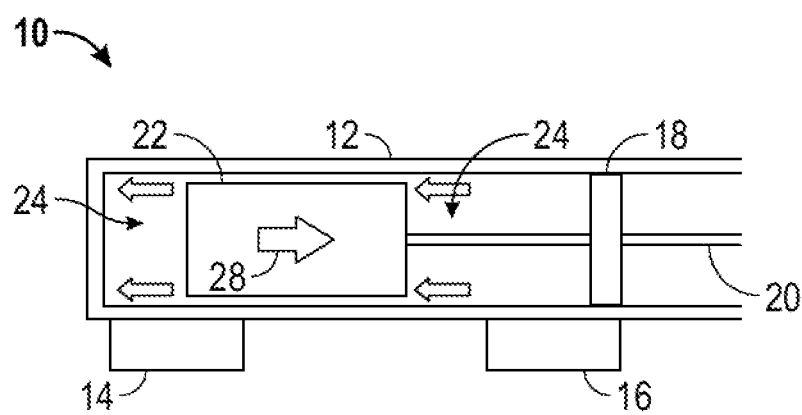
Figure 3:
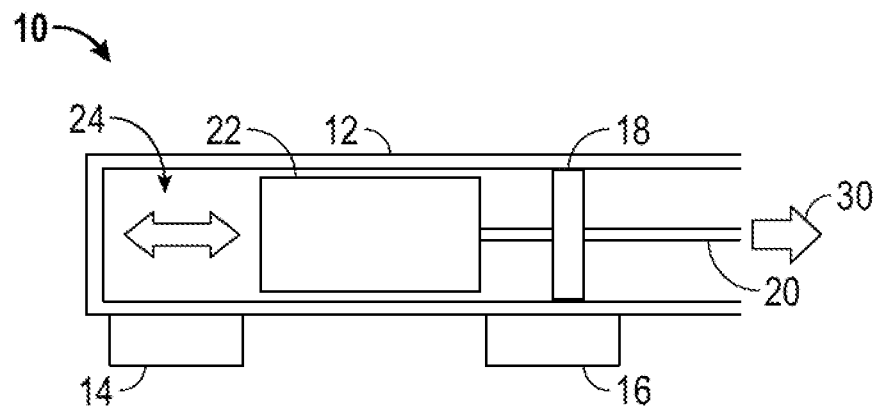
Figure 4:
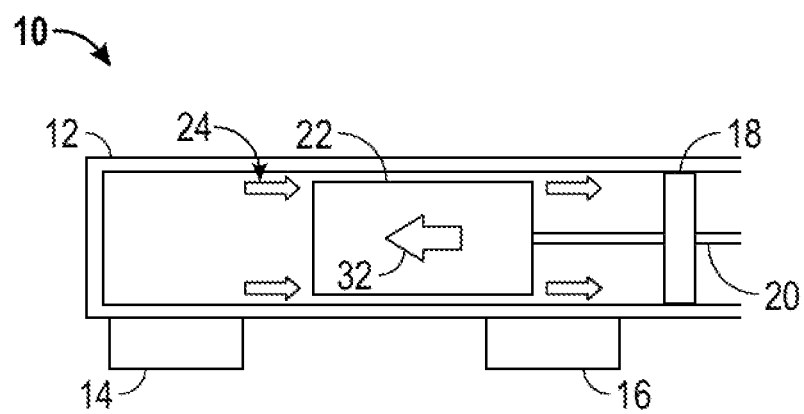
Figure 5:
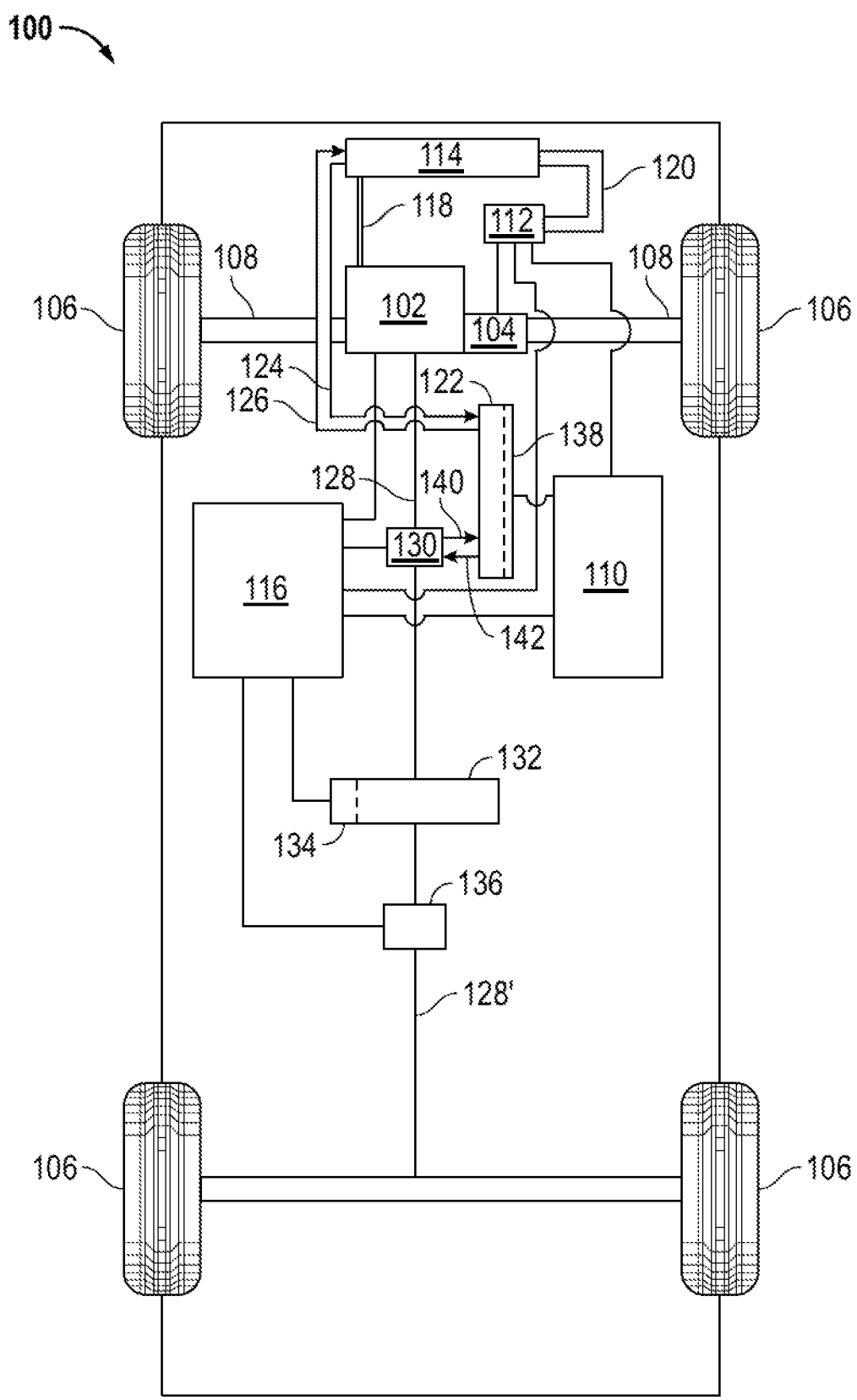
FIG. 5 is a block diagram of a Stirling engine integrated into an exhaust system of a vehicle in accordance with exemplary embodiments.

Referring to the drawings, wherein like reference numbers refer to like components, FIG. 5 shows a vehicle 100 including the exemplary embodiments of the present disclosure. The vehicle 100 may be any one of a number of different types of vehicles, such as, for example, a sedan, a wagon, a truck, or a sport utility vehicle (SUV), and may be two-wheel drive (2WD), four-wheel drive (4WD), or all-wheel drive (AWD). The vehicle 100 may also incorporate any one of, or combination of, a number of different types of engines, such as, for example, a gasoline or diesel fueled combustion engine, a flex fuel vehicle (FFV) engine (i.e., using a mixture of gasoline and alcohol), a gaseous compound (e.g., hydrogen and/or natural gas) fueled engine, a combustion/electric motor hybrid engine, and an electric motor.

In the illustrated embodiment of FIG. 5, the vehicle 100 is a hybrid electric vehicle, which includes both an internal combustion engine 102 and an electric motor 104. The internal combustion engine 102 and/or the electric motor 104 may be integrated such that one or both are mechanically coupled to at least some of the wheels 106 through one or more drive shafts 108. Also included in exemplary embodiments are an energy storage system 110 (e.g., a battery assembly having a plurality of rechargable battery cells), an inverter 112, and a cooling system 114. The internal combustion engine 102, the electric motor 104, the energy storage system 110, and the inverter 112 are in operable communication with the control system 116.

The control system 116 may include various sensors and vehicle control modules, or electronic control units (ECUs), such as an inverter control module and a vehicle controller. The energy storage system 110 may be configured to supply high voltage direct current (DC) power to the inverter 112, which may include a three-phase circuit (not shown) coupled to the electric motor 104 to convert the DC power into alternating current (AC) power.

The cooling system 114 is connected to a vehicle frame at an outer portion thereof and although not illustrated in detail, includes multiple cooling channels therein that contain a working fluid such as water and/or ethylene glycol. The cooling system 114 is coupled to the internal combustion engine 102 and the inverter 112 though coolant paths 118 and 120, respectively.

According to exemplary embodiments, the cooling system 114 is also coupled to a Stirling engine 122 via an inlet coolant path 124 and a return coolant path 126. In some embodiments, cooling system 114 may be implemented with a high temperature cooling system for the internal combustion engine 102 and a lower temperature cooling system for the Stirling engine 122 and other components of the vehicle 100. The supplied coolant maintains the cool side of the Stirling engine 122 at approximately the coolant temperature, which provides a sufficient temperature difference from the hot side of the Stirling engine to drive one or more pistons (not shown) within the Stirling engine 122 as will be appreciated by those skilled in the art. To provide the heat source for the hot side of the Stirling engine, the Stirling engine 122 is selectively coupled to the exhaust system 128 via a valve 130 such that exhaust gases may be selectively directed to the Stirling engine 122 to produce the hot side of the Stirling engine by using the heat from the exhaust gas flow. The valve 130 is operated by the controller 116, which selectively couples the Stirling engine 122 to the exhaust system 128 via criteria discussed in more detail below.

The vehicle 100 also includes an emissions control device 132, which may be a catalytic converter in some embodiments. In other embodiments, emission control devices such as, but not limited to, diesel oxidation catalysts, hydrocarbon absorbers, selective catalytic reduction devices, particulate filters (including diesel particulate filters) or other emission control systems may be employed in any particular implementation. As will be appreciated, emissions emerging from the tailpipe 128' section of the exhaust system 128 need to remain within emission regulations. Accordingly, the controller 116 controls the valve 130 to bypass the Stirling engine 122 until such time as the emission control system achieves a desired operating temperature. In one embodiment, the controller 116 allows a time period from the start of the internal combustion engine 102 to expire before controlling the valve to direct exhaust gas flow to the Stirling engine 122. The time period is selected to be sufficient in time to allow the emission control system 132 to achieve the desired operating temperature, and thus, will vary from model to model of vehicle. In other embodiments, a temperature sensor 134 may be coupled to (or integrated within) the emission control system 132 to provide the temperature of the emission control system 132 to the controller 116.

In still other embodiments, an emission sensor 136 may be coupled to the exhaust system 128 to provide emissions data to the controller 116 for determining when to operate the valve 130 to direct exhaust gas flow to the Stirling engine 122.

When the Stirling engine 122 is coupled to the exhaust system 128, heat from the exhaust gases provide a heat source for the Stirling engine 122. The cool side of the Stirling engine is provided by the cooling system 114 as discussed above. As will be appreciated, the temperature difference between the cool side and hot side of the Stirling engine drives the Stirling engine 122, which in turn, drives an alternator 138 (or other generator that is either separate from or integrated with the Stirling engine 122) to generate electrical energy for storage in the energy storage system 110 of the vehicle 100.

As will be appreciated, the emission control system 132 must be brought up to operating temperature to function as intended. Accordingly, the control system 116 operates the valve 130 to bypass (selectively decouple) the Stirling engine 122 from receiving exhaust gas flow until the occurrence of some condition or for a sufficient time period so that the emission control system 132 may properly function. In any of the exemplary embodiments, when it is determined that the emission control system 132 has achieved an operating temperature, the control system 116 operates the valve 300 to direct exhaust flow from the exhaust system 128 to the Stirling engine 122. When this occurs, the Stirling engine 122 receives heat from the exhaust system by inlet 140 and returns exhaust gases to the exhaust system via outlet 142. As a result, the temperature of the hot side of the Stirling engine 122 rises until a sufficient difference exists between the cool side of the Stirling engine 122, which is cooled as discussed above. The temperature difference then drives the Stirling engine 122, which in turn, drives the generator 138.

Figure 6:
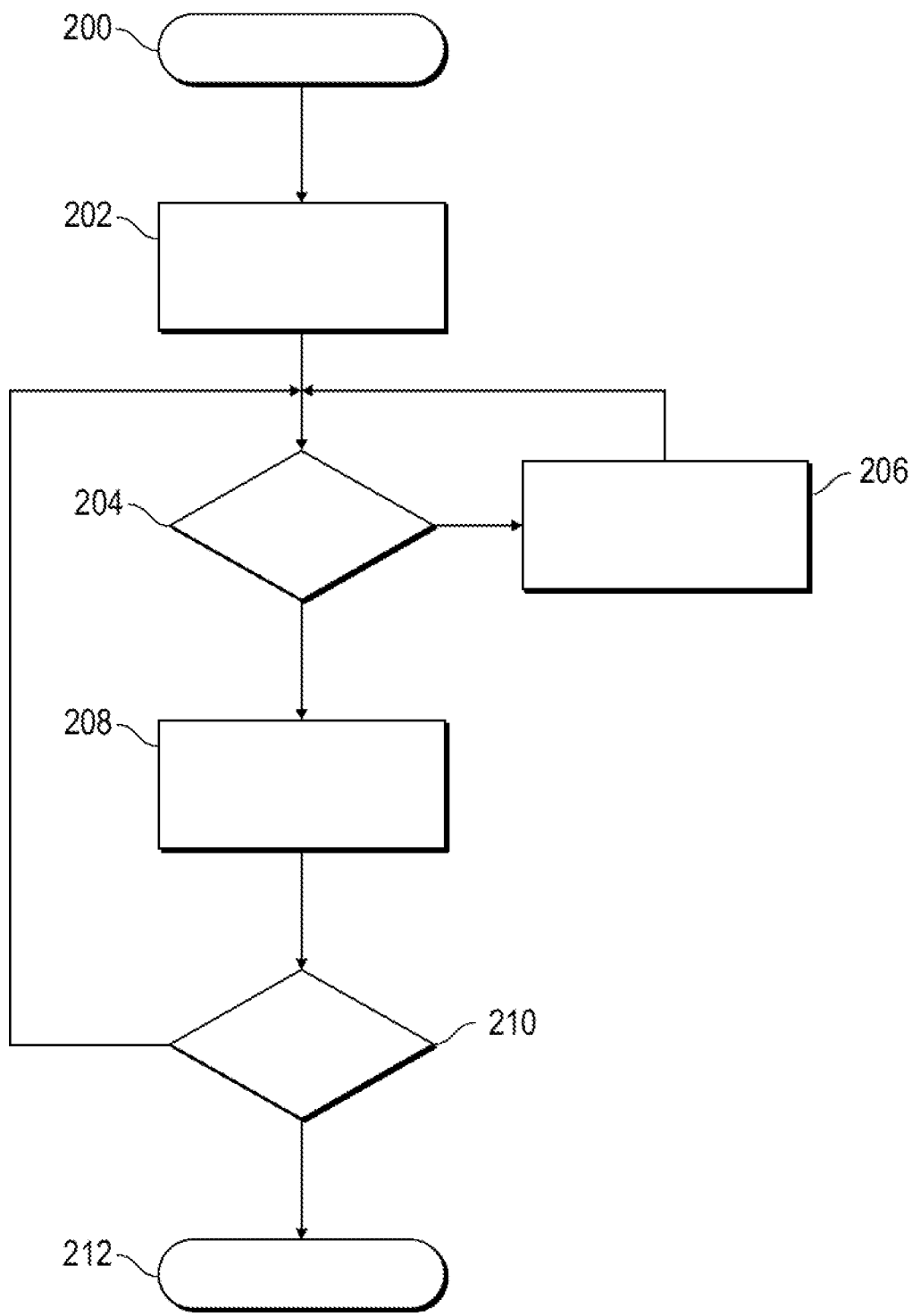
FIG. 6 is a flow chart illustrating a method according to exemplary embodiments of the present disclosure.

FIG. 6 illustrates a flow diagram useful for understanding an exemplary method 200 of the present disclosure. The various tasks performed in connection with the method 200 of FIG. 6 may be performed by software, hardware, firmware, or any combination thereof For illustrative purposes, the following description of the method of FIG. 6 may refer to elements mentioned above in connection with FIG. 5. In practice, portions of the method 200 of FIG. 6 may be performed by different elements of the described system. It should also be appreciated that the method of FIG. 6 may include any number of additional or alternative tasks and that the method of FIG. 6 may be incorporated into a more comprehensive procedure or process having additional functionality not described in detail herein. Moreover, one or more of the tasks shown in FIG. 6 could be omitted from an embodiment of the method 200 of FIG. 6 as long as the intended overall functionality remains intact.

The routine begins in step 202 where engine start (e.g., starting of the internal combustion engine 102 (FIG. 5) is detected. Next, decision 204 determines whether a condition has been detected for coupling the Stirling engine (122 in FIG. 5) to the exhaust system (128 in FIG. 5) so that the Stirling engine 122 may receive exhaust gas flow. Such a condition could be the expiration of a time interval, determining that the emission control system (132 in FIG. 5) is within operating temperature or that exhaust emissions are below a threshold (via emissions sensor 136 in FIG. 5). If the condition has not occurred, step 206 continues to bypass exhaust gas flow from the Stirling engine 122.

Conversely, if the determination of decision 204 is that the condition has occurred, step 208 engages the Stirling engine by operating the valve (130 in FIG. 5) to couple the Stirling engine 122 to the exhaust system 128 so that the Stirling engine 122 may drive the generator (138 in FIG. 5) to generate power for storage in the energy storage system (110 in FIG. 5). Decision 210 determines whether the internal combustion engine (102 in FIG. 5) is been turned off in which case, the routine ends (step 212). However, a negative determination of decision 210 loops the routine back to decision 204, which determines whether the condition now fails to be detected (e.g., the temperature of the emission control system 132 has fallen below a desired temperature threshold). So long as the exhaust system operates within required emissions regulations, the Stirling engine 122 operates the generator 138 to produce electrical energy for use by the vehicle (100 in FIG. 5) and storage in the energy storage system (110 in FIG. 5).

Accordingly, a Stirling engine is incorporated into the exhaust system of a vehicle to recover waste heat energy and provide additional electrical power, while maintaining emission control requirements. While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing summary and detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system, comprising:
   an engine;
   a cooling system coupled to the engine;
   an exhaust system coupled to the engine;
   an emission control system coupled to the exhaust system;
   an emission sensor coupled to the emission control system for sensing emissions from the emission control system;
   a Stirling engine coupled to the cooling system at a first end thereof and selectively coupled at a second end to the exhaust system between the engine and the emission control system, and driven using the cooling system and heat extracted from exhaust gas flow when the emissions from the emission control system are within the predetermined emission regulations;
   a control system coupled to the emission sensor and configured to decouple the Stirling engine is from the exhaust system from engine start until the emission sensor senses that emissions from the emission control system are within the predetermined emission regulations and thereafter couple the Stirling engine to the exhaust system;
   an electrical energy generator coupled to and driven by the Stirling engine to generate electrical energy; and
   an energy storage system coupled to the electrical energy generator for storing the electrical energy generated by the electrical energy generator.

2. The system of claim 1, further comprising a valve coupled to the exhaust system and the Stirling engine for selectively coupling the Stirling engine to the exhaust system.

3. The system of claim 2, wherein the control system is coupled to the valve for controlling when the exhaust gas flow is directed to the Stirling engine.

4. The system of claim 1, wherein the emission control system includes one of the following group of emission control devices: catalytic converter; diesel oxidation catalyst; hydrocarbon absorber, selective catalytic reduction or diesel particulate filter.

5. The system of claim 1, wherein the electrical energy generator comprises an alternator coupled to the Stirling engine.

6. The system of claim 1, wherein the energy storage system comprises a plurality of rechargeable battery cells.

7. The system of claim 1, further comprising the control system being configured to decouple the Stirling engine from the exhaust system when the emission sensor indicates that emissions from the exhaust system cease to be within the predetermined emission regulations.

8. The system of claim 1, wherein the control system operates to decouple the Stirling engine from the exhaust system from engine start until the emissions are within the predetermined emission regulations, thereafter selectively couple the Stirling engine to the exhaust system when the emissions are within the predetermined emission regulation and again decouple the Stirling engine from the exhaust system when the emissions cease to be within the predetermined emission regulations.

9. A method, comprising:
   starting an engine of a vehicle;
   controlling a valve to direct exhaust gas flow from the engine to an emission control system;
   sensing emissions from the emission control system and determining when the emissions are within predetermined emission regulations;
   controlling the valve to direct the exhaust gas flow to a Stirling engine when the emissions are within the predetermined emission regulations;
   operating the Stirling engine via heat extracted from the exhaust gas flow on a first side and a second side cooled by a cooling system of the vehicle;
   generating electrical energy via a generator driven by the Stirling engine; and
   whereby, upon starting the engine, the exhaust gas flow is bypassed from the Stirling engine until the emissions are within the predetermined emission regulations, and thereafter controlling the valve to operate the Stirling engine such that electrical energy is generated by extracting heat from the exhaust gas flow.

10. The method of claim 9, further comprising storing the electrical energy generated by the generator.

11. The method of claim 9, further comprising decoupling the Stirling engine from the exhaust gas flow to cease operation of the Stirling engine when the emissions cease to be within the predetermined emission regulations.

12. A vehicle, comprising:
   an engine for propelling the vehicle;
   a cooling system coupled to the engine;
   an exhaust system coupled to the engine;
   an emission control system coupled to the exhaust system;
   a valve coupled to the exhaust system between the engine and the emission control system for selectively directing exhaust gas flow;
   a Stirling engine coupled to the cooling system at a first end thereof and selective coupled at a second end to the exhaust system via the valve, and configured to driven using the cooling system and heat extracted from the exhaust gas flow;
   a control system coupled to the valve for controlling when the Stirling engine is selectively coupled to the exhaust system, the control system operates the valve to bypass the exhaust gas flow from the Stirling engine from engine start until the emission sensor provides the signal to the control system indicating that the emissions from the emission control system are within the predetermined emission regulations, and thereafter, operates the valve to direct exhaust gas flow to the Stirling engine;
   an emission sensor coupled to the emission control system and the control system for sensing emissions from the emission control system enabling the control system to determine when the emissions from the emission control system are within predetermined emission regulations;
   an electrical energy generator coupled to and driven by the Stirling engine to generate electrical energy; and
   an energy storage system coupled to the electrical energy generator for storing the electrical energy generated by the electrical energy generator.

13. The system of claim 12, wherein the emission control system includes one of the following group of emission control devices: catalytic converter; diesel oxidation catalyst; hydrocarbon absorber, selective catalytic reduction or diesel particulate filter.

14. The system of claim 12, wherein the electrical energy generator comprises an alternator coupled to the Stirling engine.

15. The system of claim 12, wherein the control system operates to bypass the Stirling engine from the exhaust system from engine start until the emissions are within the predetermined emission regulations, thereafter selectively couple the Stirling engine to the exhaust system when the emissions are within the predetermined emission regulation and again bypass the Stirling engine from the exhaust system when the emissions cease to be within the predetermined emission regulations.

16. The system of claim 15, wherein the energy storage system comprises a plurality of rechargeable battery cells.

* * * * *